(12) United States Patent
Satish et al.

(10) Patent No.: US 8,214,900 B1
(45) Date of Patent: Jul. 3, 2012

(54) METHOD AND APPARATUS FOR MONITORING A COMPUTER TO DETECT OPERATING SYSTEM PROCESS MANIPULATION

(75) Inventors: Sourabh Satish, Fremont, CA (US); William Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 551 days.

(21) Appl. No.: 12/338,587

(22) Filed: Dec. 18, 2008

(51) Int. Cl.
*G06F 12/14* (2006.01)
(52) U.S. Cl. ............................ 726/23; 726/24
(58) Field of Classification Search .................. 726/23, 726/24; 713/187–188
See application file for complete search history.

(56) References Cited

U.S. PATENT DOCUMENTS

| | | | | |
|---|---|---|---|---|
| 7,669,059 | B2 * | 2/2010 | Brent | 713/188 |
| 2004/0168070 | A1 * | 8/2004 | Szor | 713/188 |
| 2006/0026687 | A1 * | 2/2006 | Peikari | 726/24 |

OTHER PUBLICATIONS

Buchanan, Erik et al., "When Good Instructions Go Bad: Generalizing Return-Oriented Programming to RISC," Proceedings of CCS 2008, ACM Press, Oct. 2008.
Shacham, Hovav, "The Geometry of Innocent Flesh on the Bone: Return-into-libc without Function Calls (on the x86)," Proceedings of the 14th ACM Conference on Computer and Communications Security, 2007, Sep. 5, 2007, pp. 1-29.
Buchanan, Erik et al., "Return-Oriented Programming: Exploitation without Code Injection," Black Hat USA 2008 Briefings, Aug. 2008.

* cited by examiner

*Primary Examiner* — Philip Chea
(74) *Attorney, Agent, or Firm* — Wilmer Cutler Pickering Hale and Dorr LLP (57) ABSTRACT

A method and apparatus for monitoring a computer to detect operating system process manipulation by malicious software programs is disclosed. In one embodiment, a method for detecting operating system process manipulation through unexpected process behavior includes accessing process behavior indicia regarding memory addresses used by at least one user mode process to request computer resources and comparing the process behavior indicia with a user mode request to identify operating system process manipulation.

18 Claims, 4 Drawing Sheets

METHOD AND APPARATUS FOR MONITORING A COMPUTER TO DETECT OPERATING SYSTEM PROCESS MANIPULATION

BACKGROUND OF THE INVENTION

1. Field of the Invention

Embodiments of the present invention generally relate to a memory management and code exploit prevention and, more particularly, to a method and apparatus for monitoring a computer to detect operating system process manipulation by malicious software programs.

2. Description of the Related Art

In a typical computing environment, an organization may employ a number of technologies to process, store, and secure mission critical data. For example, the organization may employ one or more security systems to detect and/or mitigate network-based threats, such as malicious software programs (e.g., a virus, a Trojan and/or the like), intrusions, SPAM and/or the like. Such security systems may monitor operating system processes and exert control over a computer memory to prevent damage and/or serious software vulnerabilities within the computing environment caused by the malicious software programs.

Occasionally, the malicious software programs utilize various techniques for exploiting such software vulnerabilities in order to disrupt operations within a computer. For example, the malicious software programs may exploit a buffer overflow vulnerability and modify a stack (i.e., control stacks, call stacks and/or the like) to facilitate operation system process manipulation. The stack may refer to a special area of computer memory that is directly managed and used by processor instructions to "push" data onto the stack for storage and/or "pop" data off of the stack for retrieval. The stack may be used to store and retrieve data related to system calls (e.g., return locations and values), system call local data (e.g. local variables, including buffers), exception frames, and arbitrary data.

For instance, the malicious software programs manipulate operating system processes by injecting code into a buffer (e.g., a fixed-length portion of computer memory within the stack). As a result, the injected code overwrites an adjacent portion of the call stack that is outside a memory region allocated to the buffer and causes a buffer overflow. To emphasize, sometimes the injected code overwrites a return pointer on the call stack with a pointer to another memory region that contains executable software code (e.g., malicious software code as well as non-malicious or arbitrary software code).

Malicious software programs are not limited to code injection techniques for attacking computers. For instance, return-oriented programming is a technique by which software vulnerabilities are exploited without injecting code. Accordingly, return-oriented programming is utilized to craft buffer overflows that return to snippets of byte sequences in executable code pages to execute arbitrary system calls. New computations are constructed by linking code snippets that end with a return instruction (i.e., "ret"). Return instructions enable an attacker who controls the call stack to chain instruction sequences together. Because the executed code is marked executable in the computer memory, security systems that allow pages (e.g., pages on the stack) to be marked as non-executable (e.g., WAX and DEP) are unable to prevent execution of the chained instruction sequences. Such security systems operate on the erroneous assumption that preventing malicious code injection is sufficient to prevent the introduction of malicious computation.

Therefore, there is a need in the art for a method and apparatus for monitoring a computer to detect operating system process manipulation by malicious software programs.

SUMMARY OF THE INVENTION

Embodiments of the present invention generally include a method and apparatus for monitoring a computer to detect operating system process manipulation by malicious software programs. In one embodiment, the method for detecting operating system process manipulation through unexpected process behavior includes accessing process behavior indicia regarding memory addresses used by at least one user mode process to request computer resources and comparing the process behavior indicia with a user mode request to identify operating system process manipulation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
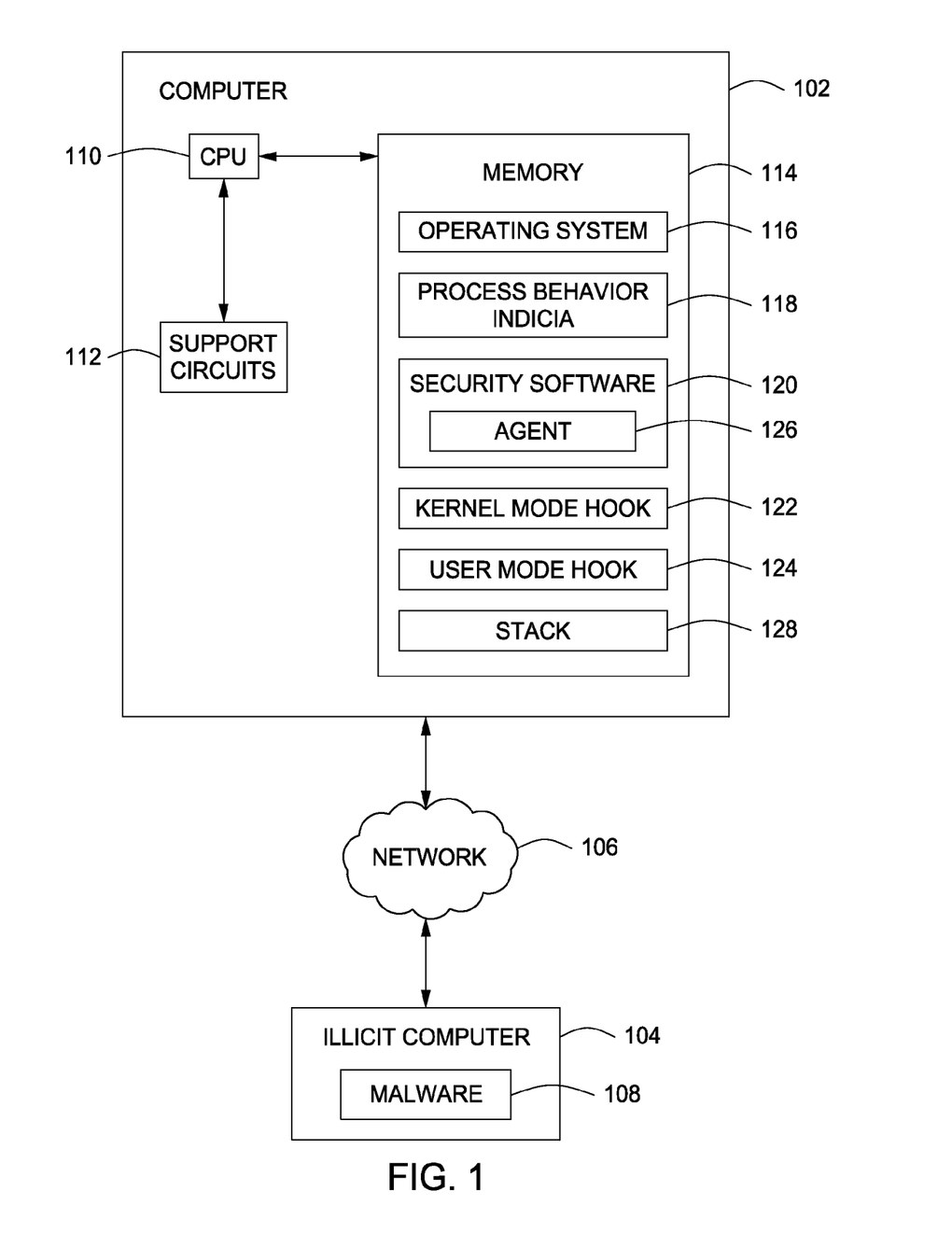
FIG. 1 is a block diagram of a system for monitoring a computer to detect operating system process manipulation according to various embodiments.

FIG. 1 is a block diagram of a system 100 for monitoring a computer 102 to detect operating system process manipulation according to various embodiments. In one embodiment, the system 100 includes the computer 102 and the illicit computer 104 where each is coupled to each other through a network 106.

The host computer 102 is a type of computing device (e.g., a laptop, a desktop, a Personal Desk Assistant (PDA), a tablet, a mobile phone and the like) that comprises a central processing unit (CPU) 110, various support circuits 112 and a memory 114. The CPU 110 may comprise one or more commercially available microprocessors or microcontrollers that facilitate data processing and storage. Various support circuits 112 facilitate operation of the CPU 110 and may include clock circuits, buses, power supplies, input/output circuits and/or the like. The memory 114 includes a read only memory, random access memory, disk drive storage, optical storage, removable storage, and the like. The memory 114 includes various data, such as process behavior indicia 118 and a stack 128. The memory 114 includes various software packages, such as an operating system 116, security software 120, a kernel-mode hook 122 and a user-mode hook 124.

The illicit computer 104 is a type of computing device (e.g., a laptop, a desktop, a Personal Desk Assistant (PDA), a tablet, a mobile phone and the like), such as those known in the art. The illicit computer 104 may attempt to deploy malware 108 at the computer 102. In one embodiment, the malware 108 exploits a stack buffer overflow to achieve operating system process manipulation.

The network 106 comprises a communication system that connects computers by wire, cable, fiber optic, and/or wireless links facilitated by various types of well-known network elements, such as hubs, switches, routers, and the like. The network 106 may employ various well-known protocols to communicate information amongst the network resources. For example, the network 106 may be part of the Internet or intranet using various communications infrastructure such as Ethernet, WiFi, WiMax, General Packet Radio Service (GPRS), and the like.

The operating system 116 includes software code that is configured to manage various computer resources and facilitate application services within the computer 102. The operating system 116 may be used to perform various input/output (I/O) activities on one or more hardware devices on behalf of one or more software programs. In one embodiment, the one or more software programs (e.g., malicious and non-malicious software programs) access various computer resources (e.g., one or more pages (i.e., software code pages) within the memory 114) using the operating system 116. For example, a user-mode process (e.g., an instance of software program) may invoke a system call (e.g., CreateFile( )) through a request communicated to a kernel (e.g., a core component of the operating system). In one embodiment, the request is communicated by a library function (e.g., a dynamic link library function such as CreateSection( )). In response to such a request, the kernel verifies one or more system call parameters. If acceptable, the kernel executes one or more software code pages to perform the system call and exports any results back to the user-mode process.

According to various embodiments, the process behavior indicia 118 includes information for detecting operating system process manipulation. In one embodiment, the process behavior indicia 118 includes call-state information regarding one or more user-mode entry points (e.g., memory addresses within the user address space) associated with a gate (e.g., a call gate, an interrupt gate, a trap gate and/or the like) through which execution of a system call is transferred to more privileged software code within the kernel (e.g., a kernel system call handler). For example, the call-state information indicates an ENTRY, EXIT or NULL state for each expected entry point associated with standard invocations of a system call. In other words, the user-mode entry points may include memory addresses within a dynamic library (e.g., ntdll.dll) normally invoked by a particular user-mode process for the system call.

In another embodiment, the process behavior indicia 118 includes call-origination information regarding one or more locations (e.g., memory addresses) within the user address space from which a request for kernel-mode services (e.g., a system call) originates. For example, the process behavior indicia 118 may include memory address of one or more gates (e.g., call gates) through which control is transferred to a system call handler by various instructions, such as a SYSENTER, SYSCALL and/or INT 2E instruction. The call-origination information may also define one or more return locations to which execution of the system call returns after completion (e.g., a next instruction after the SYSENTER, SYSCALL and/or INT 2E instruction). In one embodiment, call-origination information indicates one or more memory regions within the user-mode address space from which the system call is transferred to kernel-mode. For example, the call-origination information identifies one or more code pages (e.g., executable code pages for ntdll.dll functions), which are normally associated with execution of a particular user-mode process. In other words, the system call is expected to return to a location within the one or more code pages.

Accordingly, a return memory address associated with the system call is compared with the call-origination information to detect operating system process manipulation. According to one embodiment, if the return memory address is within the expected code pages, there is strong likelihood that the system call is a standard invocation and the particular user-mode process is operating normally. On the other hand, if the return memory address is not within the expected code pages, there is a strong likelihood that the particular user-mode process is being manipulated by a malicious software program, such as the malware 108. For instance, there are very few reasons for the particular user-mode process to access unexpected locations within executable code pages associated with ntdll.dll functions.

Furthermore, the return memory address may refer to an instruction subsequent to the system call (i.e., instruction). As such, if the system call is not expected to be invoked by the particular user-mode process, there is a strong likelihood that the particular user-mode process is being manipulated by a malicious software program, such as the malware 108. For instance, the system call may originate from and/or return to an executable code page that includes misaligned instructions. As explained further below, instruction alignment characteristics for the executable code page are compared with information regarding the return memory address to identify the misaligned instructions. Accordingly, the instruction that includes the return memory address as well as the system call instruction are misaligned.

In one embodiment, the process behavior indicia 118 includes instruction alignment characteristics (e.g., n-byte boundary, page boundary and/or the like) associated with ntdll.dll functions that invoke SYSCALL, SYSENTER and/or INT 2E instructions. As an example, if instructions on an executable code page are normally aligned in accordance with an eight-byte boundary and the return memory address is located at byte seven, then there is a strong likelihood that the particular user-mode process is being manipulated. Furthermore, interpreted byte sequences before and/or after the return memory address may or may not be instructions that are normally associated with the particular user-mode process. As such, the process behavior indicia 118 may include information regarding a number of instructions from an expected return memory address where a disassembly may identify valid software code.

According to various embodiments, the process behavior indicia 118 may be generated through static and/or dynamic analysis of one or more operating system processes. In one embodiment, the process behavior indicia 118 may be created offline and hardcoded into the kernel-mode hook 122. In another embodiment, the process behavior indicia 118 may be updated dynamically as the one or more operating system processes are monitored. For example, the call-state information, the call-origination information and the instruction alignment characteristics may be determined statically and/or dynamically and then, transferred to the kernel prior to startup.

The security software 120 includes software code that is configured to protect various computer resources. The security software 120 may be a feature associated with the operating system 116. In one embodiment, the security software 120 manages an address space for each and every operating system process (e.g., user-mode, kernel-mode and/or the like) within the memory 114. According to one or more embodiments, the security software 120 includes an agent 126 that is configured to monitor one or more user-mode processes.

In one embodiment, the agent 126 dynamically profiles instruction alignment characteristics around one or more system calls of NTDLL.DLL functions. Subsequently, the agent 126 stores the instruction alignment characteristics in the process behavior indicia 118. For example, the agent 126 identifies SYSCALL, SYSENTER and INT 2E instructions within the NTDLL.DLL functions and determines whether such instructions are aligned on page boundaries or n-byte boundaries. Then, the agent 126 updates the process behavior indicia 118 with such determinations. As such, the instruction alignment characteristics are accessible to any kernel-mode process, such as the kernel-mode hook 122. As explained further below, the kernel-mode hook 122 examines the instruction alignment characteristics to identify memory locations regarding system calls as well as expected return locations within a user-mode process address space.

The kernel-mode hook 122 and the user-mode hook 124 are software programs that are configured to intercept procedure calls (e.g., system calls) within a kernel address space and a user address space respectively. Generally, an address space defines one or more discrete computer memory regions. Further, various operating system processes (e.g., threads) may reside within the address space. As such, the kernel address space refers to one or more locations (i.e., addresses) within the memory 114 that are provisioned to the kernel of the operating system 116. Hence, the kernel-mode hook 122 resides within the kernel address space and intercepts system calls according to one embodiment. Similarly, the user-mode hook 124 resides within the user address space and intercepts system calls according to one embodiment. For example, a memory address for the kernel-mode hook 122 may be written to a Service Descriptor Table at a location of an actual memory address for an NTDLL.DLL function. Accordingly, control over the execution of the ntdll.dll function is transferred to the kernel-mode hook 122 instead of an actual implementation.

According to one or more embodiments, the stack 128 includes a portion of the memory 114 that is directly managed and used by processor instructions to "push" data onto the stack 128 for storage and/or "pop" data off of the stack 128 for retrieval during software code execution. The stack 128 may be used to store and retrieve data related to system calls (e.g., return locations and values), system call local data (e.g. local variables, including buffers), exception frames and/or arbitrary data. Furthermore, the stack 128 may be referred to as a call stack, an execution stack and/or the like.

In one embodiment, the stack 128 may represent a control flow related to one or more operating system processes. For example, the stack 128 may indicate one or more locations (e.g., memory addresses) within a user address space and/or a kernel address space for executing software code and/or processing data. In one embodiment, the malware 108 may overwrite one or more portions of the stack 128 with return instructions to arbitrary executable software code segments (i.e., byte sequences) in order to perform some functionality (e.g., misappropriate confidential information, crash a computer and/or the like).

The kernel-mode hook 122 includes software code that is configured to compare the process behavior indicia 118 with various information regarding user-mode requests for various services (e.g., system calls) to detect operating system process manipulation. In one embodiment, a particular user-mode process invokes a user-mode request using dynamic link library functions. As such, the user-mode request is transferred to kernel-mode through a gate (e.g., SYSENTER, SYSCALL and/or INT 2E instructions), which provides an entry point for a corresponding kernel system call handler. Then, the kernel-mode hook 122 intercepts the user-mode request before the kernel system call handler transfers the user-mode request to an actual implementation of a requested service (e.g., executable code pages for the system call).

Subsequently, the kernel-mode hook 122 compares the process behavior indicia 118 with a return memory address associated with the user-mode request to detect manipulation of the particular user-mode process by the malware 108. In one embodiment, the kernel-mode hook 122 determines that the return memory address is an expected location within the user-mode address space. In other words, the corresponding kernel event handler is most likely to transfer the user-mode request to the return memory address during execution of the particular user-mode process. In another embodiment, the kernel-mode hook 122 determines that the user-mode request is not expected to return to the return memory address. Because there are very few reasons to justify returning to unexpected location, there is a strong likely of operating system process manipulation. As such, the user-mode request has been most likely invoked for malicious purposes. In one embodiment, the kernel-mode hook 122 reports the manipulation of the particular user-mode process to a system administrator. In another embodiment, the kernel-mode hook 122 terminates or suspends the particular user-mode process in order to remediate the operating system process manipulation.

According to one or more embodiments, the kernel-mode hook 122 and the user-mode hook 124 cooperate to detect operating system process manipulation. In one embodiment, the user-mode hook 124 instruments one or more entry points that are normally invoked by a particular user-mode process. Accordingly, as a user-mode request is transferred through the one or more entry points, call-state information is updated to represent an ENTRY state for the one or more entry points. As the user-mode request is transferred back through the call-gates, the user-mode hook 124 updates the call-state information to represent an EXIT state. Before a subsequent invocation of the user-mode request, the user-mode hook 124 sets the call-state information to a NULL state for the one or more entry points.

In operation, the malware 108 exploits a buffer overflow of the stack 128 and manipulates the particular user-mode process into directly accessing a gate without invoking the one or more entry points. Consequently, the user-mode hook 124 does not update the call-state information. As such, the call-state information remains NULL and execution of the user-mode request is transferred to the kernel-mode. Then, the kernel-mode hook 122 intercepts the user-mode request and examines the call-state information. Subsequently, the kernel-mode hook 122 determines that each and every entry point is not set to an ENTRY state. Therefore, the kernel-mode hook 122 identifies operating system process manipulation because there are very few reasons for not invoking the one or more entry points. In one embodiment, the kernel-mode hook 122 prevents further execution of the user-mode request.

Figure 2:
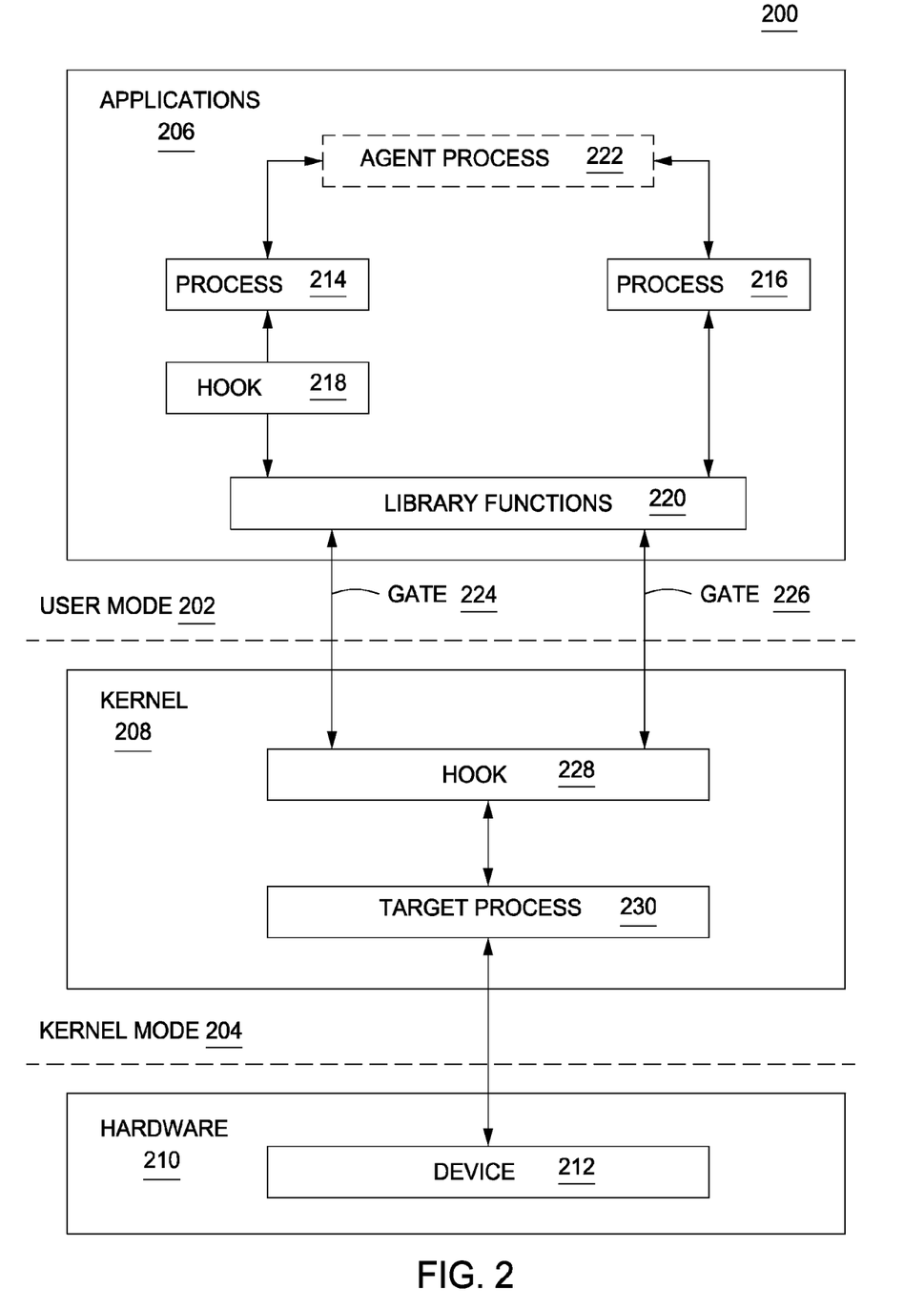
FIG. 2 is a functional block diagram of an architecture for monitoring a computer to detect operating system process manipulation according to various embodiments.

FIG. 2 is a functional block diagram of an architecture 200 for monitoring a computer to detect operating system process manipulation according to various embodiments. The architecture 200 illustrates operating system processes that function in two distinct modes: a user-mode 202 and a kernel-mode 204.

In one embodiment, applications 206 are software programs that request services from a kernel 208 in order to access various computer resources, such as hardware 210 (i.e., computer hardware components and devices). The applications 206 include a process 214 (i.e., a user-mode operating system process) and a process 216. Furthermore, the applications 206 include a hook 218 (i.e., an instance of a user-mode hook, such as the user-mode hook 124 of FIG. 1) that intercepts user-mode requests for kernel-mode services (e.g., system calls) before a transition to the kernel-mode 204 as explained further below. Optionally, the applications 206 include an agent process 222 that monitors the process 214 and the process 216 in order to generate the process behavior indicia. In one embodiment, the agent process 222 dynamically profiles information regarding the user-mode 202, such as instruction alignment characteristics of code pages within the library functions 220.

Because the kernel 208 includes privileged code, the process 214 and the process 216 may not directly access memory addresses outside of the user-mode 202. In order to invoke system calls, the process 214 and the process 216 may use one or more library functions 220 (e.g., ntdll.dll) as an interface to the kernel 208. The library functions 220 include one or more processes that facilitate the transition from the user-mode 202 to the kernel-mode 204. In one embodiment, the library functions 220 process and route the user-mode requests to the kernel 208 through a gate 224 and/or a gate 226. Generally, the gate 224 and the gate 226 are components (e.g., call gates, interrupt gates and/or the like) that transition system calls from the user-mode 202 to the kernel-mode 204. As such, the user-mode requests are communicated through the gate 224 and/or the gate 226 and handled by the kernel 208.

In response to the user-mode requests, the kernel 208 provides the applications 206 with the requested kernel-mode services as well as access to the hardware 210. In addition, the kernel 208 includes a hook 228 (i.e., an instance of a kernel-mode hook, such as the kernel-mode hook 122 of FIG. 1) and a target process 230. For example, the target process 230 may be an instance of driver for accessing data with device 212 (e.g., a RAID disk array). In operation, the process 214 invokes a user-mode request that is eventually communicated to the target process 230, which performs various input/output activities upon the device 212 according to one or more embodiments.

In one embodiment, the hook 218 is executed when the process 214 calls a function of the library functions 220 to which one or more expected entry points are invoked. The hook 218 updates call-state information to indicate ENTRY states for the one or more expected entry points and returns control back to the called library function. Subsequently, the function transfers execution of a user-mode request to the kernel-mode 204 through the gate 224, which provides a location of executable software code in the kernel 208 that corresponds with such a user-mode request (e.g., a kernel system call handler).

Before the user-mode request is further transferred to such executable software code, the hook 228 intercepts the user-mode request. Then, the hook 228 compares the user-mode request (e.g., a system call) with process behavior indicia (e.g., the process behavior indicia 118 of FIG. 1) related to the process 214 to detect operating system process manipulation. In one embodiment, the hook 228 examines the call-state information to determine whether the one or more expected entry points to the library functions 220 were invoked during the user-mode request execution. In another embodiment, the hook 228 examines call-origination information to determine whether one or more expected library function locations were utilized as origination locations and/or return locations during the user-mode request execution.

For example, if the hook 228 identifies an expected entry point in a NULL or EXIT state (i.e., not invoked) within the call-state information, then there is a strong likelihood of operating system process manipulation. On the other hand, if the hook 228 establishes that each and every entry point of the one or more entry points are in the ENTRY state, then the user-mode request (e.g., system call) is most likely legitimate. Accordingly, the hook 228 communicates the user-mode request to the target process 230 where execution of the user-mode request is to proceed until completion and/or error.

In one embodiment, malicious software programs manipulated the process 216 to perform various illicit activities (e.g., execute arbitrary system calls to misappropriate confidential information). As such, the process 216 did not invoke one or more expected entry points. Instead, the process 216 directly accessed the gate 226 and attempted to transfer the user-mode request to the target process 230. Accordingly, the hook 228 interrupted the user-mode request and examined the call-state information to determine that the one or more expected entry points were not invoked. Consequently, the hook 228 reports the user-mode request and/or the process 216 to a system administrator.

As another example, if the hook 228 identifies a return location and/or an origination location that does not correspond with an expected library function location within the call-origination information, then there is a strong likelihood of operating system process manipulation. On the other hand, if the hook 228 determines that each and every return location and/or origination location is within an expected library function location, then the user-mode request is most likely legitimate. Accordingly, the hook 228 communicates the user-mode request to the target process 230 where execution of the user-mode request is to proceed until completion and/or error.

In another embodiment, malicious software programs manipulate the process 216 to access and interpret random and/or unexpected byte sequences to achieve malicious results. As such, the process 216 did not utilize one or more expected library function locations as return and/or origination locations for execution of a user-mode request. Instead, the process 216 executed arbitrary and/or unexpected instructions within the library functions 220. As a result, the process 216 attempts to communicate a user-mode request from an unexpected library function location through the gate 226, which is an unexpected gate based on the process behavior indicia. Accordingly, the hook 228 interrupts the user-mode request and examines the call-origination information to determine that the one or more expected library function locations were not utilized as return and/or origination locations. Consequently, the hook 228 reports the user-mode request and/or the process 216 to a system administrator.

Figure 3:
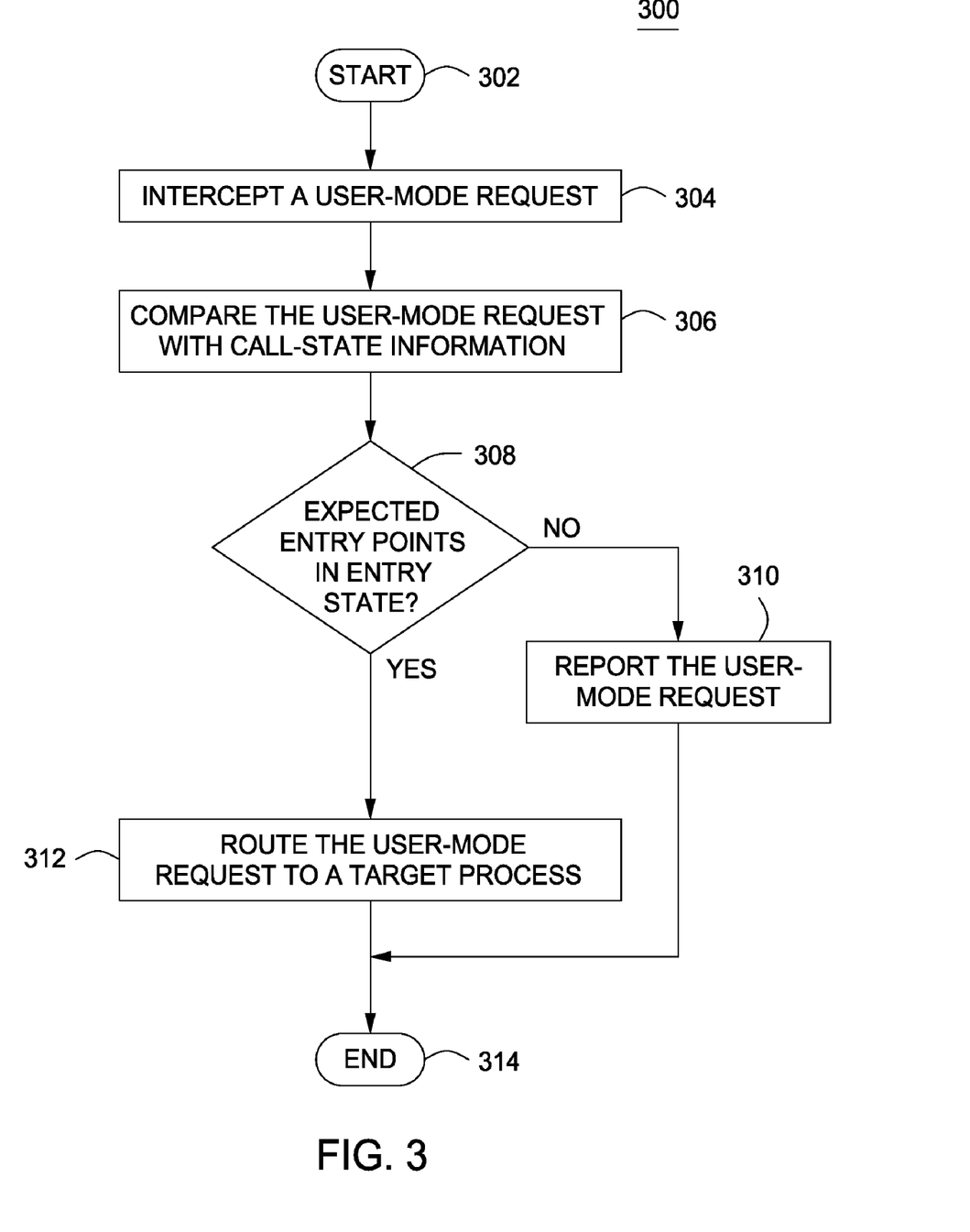
FIG. 3 is a flow diagram of a method for detecting operating system process manipulation using call-state information according to various embodiments.

FIG. 3 is a flow diagram of a method 300 for detecting operating system process manipulation using call-state information according to various embodiments. In one embodiment, the method 300 starts at step 302 and proceeds to step 304 at which a user-mode request for kernel-mode services (e.g., a system call) is intercepted. For example, the user-mode request may be intercepted by a kernel-mode hook (e.g., the kernel-mode hook 122 of FIG. 1).

At step 306, the user-mode request is compared with the call-state information. At step 308, a determination is made as to whether the call-state information indicates an ENTRY state for each and every expected entry point. If the call-state information does not indicates an ENTRY state for each and every expected entry point, then the method 300 proceeds to step 310. For example, one or more expected entry points may have a NULL state, which indicates operating system process manipulation because there are very few reasons for not invoking each and every expected entry point. At step 310, the user-mode request is reported as evidence of the operating system process manipulation. After step 310, the method 300 proceeds to step 314. If the call-state information indicates an ENTRY state for each and every expected entry point, then the method 300 proceeds to step 312. At step 312, the user-mode request is routed to a target process. At step 314, the method 300 ends.

Figure 4:
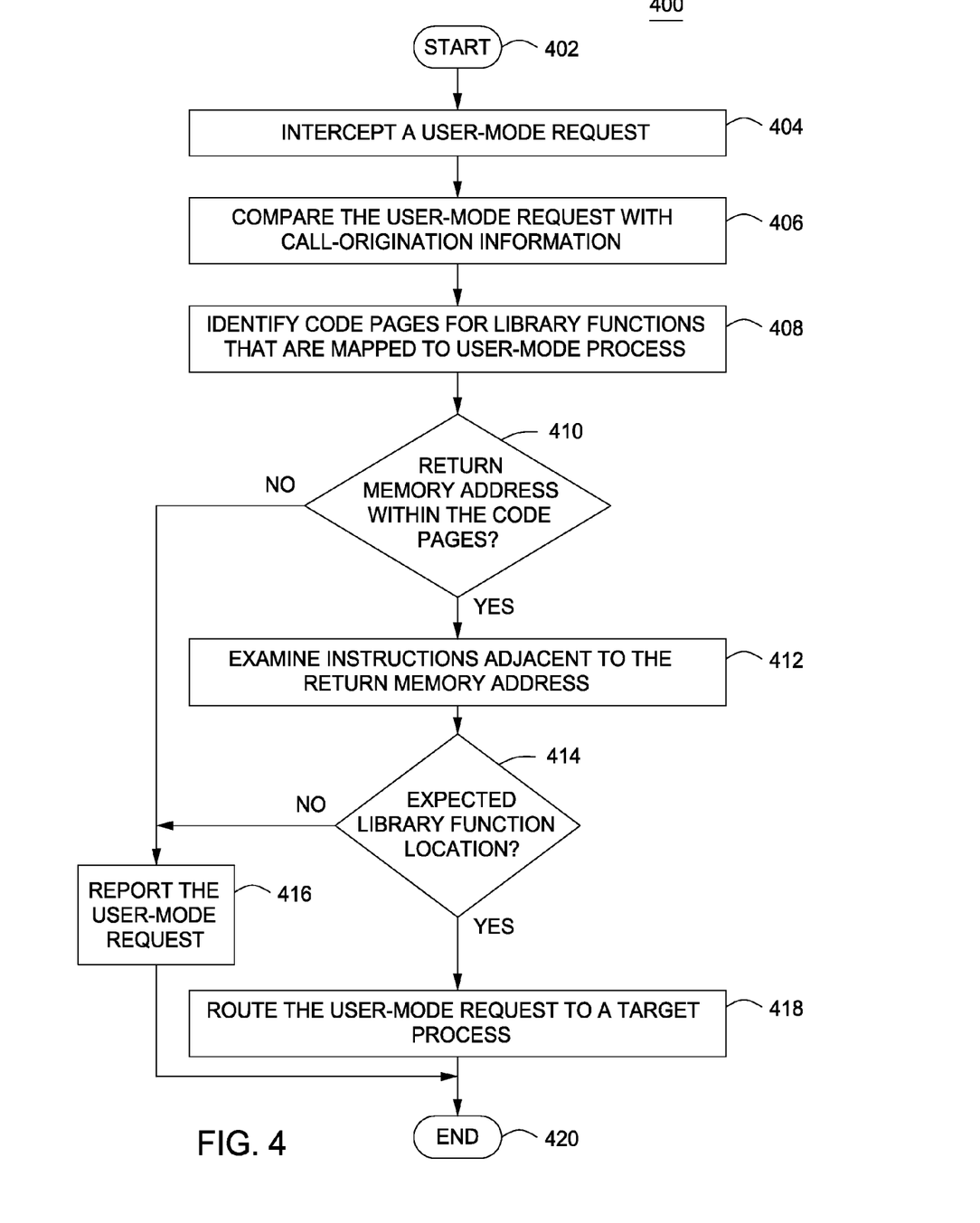
FIG. 4 is a flow diagram of a method for detecting operating system process manipulation using call-origination information according to various embodiments.

FIG. 4 is a flow diagram of a method 400 for detecting operating system process manipulation using call-origination information according to various embodiments. In one embodiment, the method 400 starts at step 402 and proceeds to step 404 at which a user-mode request for kernel-mode services (e.g., a system call) is intercepted. For example, the user-mode request may be intercepted by a kernel-mode hook (e.g., the kernel-mode hook 122 of FIG. 1).

At step 406, the user-mode request is compared with the call-origination information. In one embodiment, the user-mode request includes a return memory address to which execution of the user-mode request is transferred after completion. In another embodiment, the call-origination information includes one or more memory addresses (e.g., return locations and/or origination locations) that are associated with one or more expected library functions. In other words, the one or more memory addresses indicate expected library function locations for the user-mode request. At step 408, code pages for the one or more expected library functions that are mapped to a user-mode address space are verified.

At step 410, a determination is made as to whether the return memory address is within the verified code pages. If the return memory address is determined to be within the verified code pages, then the method 400 proceeds to step 412. If the return memory address is determined to be outside the verified code pages, then the method 400 proceeds to step 416. At step 412, one or more instructions adjacent to the return memory address are examined. In one embodiment, the one or more adjacent instructions may be before or after the return memory address. After step 412, the method 400 proceeds to step 414. At step 414, a determination is made as to whether the return memory address is an expected library function location. If it is determined that the return memory address is not an expected library function location, then the method 400 proceeds to step 416. At step 416, the user-mode request is reported. If it is determined that the return memory address is an expected library function location, then the method 400 proceeds to step 418. At step 418, the user-mode request is routed to a target process. At step 420, the method 400 ends.

While the foregoing is directed to embodiments of the present invention, other and further embodiments of the invention may be devised without departing from the basic scope thereof, and the scope thereof is determined by the claims that follow.

The invention claimed is:

1. A method for detecting operating system process manipulation through unexpected process behavior, comprising:

accessing, using at least one computer processor configured to execute a kernel-mode hook, process behavior indicia regarding memory addresses used by at least one user mode process to request computer resources via the kernel-mode hook;

executing the kernel-mode hook by calling a function of library functions to which at least one entry point are invoked;

examining call-state information associated with the at least one user mode process to determine whether the at least one entry point to the library functions was invoked during the at least one user mode process; and comparing the process behavior indicia with a user mode request to identify operating system process manipulation, wherein comparing the process behavior indicia further comprises examining call-state information associated with the at least one user mode process to identify at least one expected entry point that is not invoked.

2. The method of claim 1, wherein accessing the process behavior indicia further comprises updating call-state information in response to at least one invocation of at least one expected entry point by the user mode request.

3. The method of claim 1, wherein accessing the process behavior indicia further comprises monitoring the at least one operating system process to generate the process behavior indicia.

4. The method of claim 3 further comprising identifying at least one code page that is associated with an expected library function and mapped to a user-mode address space to generate call-origination information.

5. The method of claim 4 further comprising examining the at least one code page to identify a return memory address to which the user-mode request transfers execution.

6. The method of claim 5 further comprising examining at least one instruction adjacent to the return memory address to determine an expected library function location.

7. The method of claim 5 further comprising determining at least one instruction alignment characteristic associated with the at least one code page.

8. The method of claim 7, wherein comparing the process behavior indicia with the user-mode request further comprises comparing the at least one instruction alignment characteristic with information regarding the return memory address.

9. The method of claim 8 further comprising identifying a misaligned instruction that comprises the return memory address.

10. The method of claim 1 further comprising terminating a user-mode process of the at least one user-mode process that is associated with the operating system process manipulation.

11. An apparatus for detecting operating system process manipulation through unexpected process behavior, comprising:

at least one computer processor communicatively coupled to memory, the at least one computer processor configured to:

execute a kernel-mode hook configured to access process behavior indicia regarding memory addresses used by at least one user mode process to request computer resources;

call a function of library functions to which at least one entry point are invoked;

examine callstate information associated with the at least one user mode process to determine whether the at least one entry point to the library functions was invoked during the at least one user mode process; and compare the process behavior indicia with the user mode request to identify operating system process manipulation, wherein the kernel-mode hook examines callstate information associated with the at least one user mode process to identify at least one expected entry point that is not invoked.

12. The apparatus of claim 11 further comprising a user-mode hook for updating callstate information in response to at least one invocation of at least one expected entry point by the user mode request.

13. The apparatus of claim 11 further comprising an agent for monitoring the at least one operating system process to generate the process behavior indicia.

14. The apparatus of claim 11, wherein the kernel-mode hook identifies at least one code page that is associated with an expected library function and mapped to a user-mode address space to generate call-origination information.

15. The apparatus of claim 14, wherein the kernel-mode hook examines the at least one code page to identify a return memory address to which the user-mode request transfers execution.

16. The apparatus of claim 14, wherein the kernel-mode hook examines at least one instruction adjacent to the return memory address to determine an expected library function location.

17. The apparatus of claim 16, wherein the kernel-mode hook determines at least one instruction alignment characteristic associated with the at least one code page.

18. The apparatus of claim 17, wherein the kernel-mode hook compares the at least one instruction alignment characteristic with information regarding the return memory address to identify a misaligned instruction that comprises the return memory address.

\* \* \* \* \*